United States Patent
Gotani et al.

(10) Patent No.: US 10,905,523 B2
(45) Date of Patent: Feb. 2, 2021

(54) LUBRICATION INFORMATION MANAGEMENT DEVICE FOR DENTISTRY

(71) Applicant: THE YOSHIDA DENTAL MFG. CO., LTD., Tokyo (JP)

(72) Inventors: Yoshiki Gotani, Tokyo (JP); Takafumi Sato, Tokyo (JP); Keiichi Kudo, Tokyo (JP)

(73) Assignee: THE YOSHIDA DENTAL MFG. CO., LTD., Tokyo (JP)

( * ) Notice: Subject to any disclaimer, the term of this patent is extended or adjusted under 35 U.S.C. 154(b) by 192 days.

(21) Appl. No.: 16/099,774

(22) PCT Filed: Apr. 21, 2017

(86) PCT No.: PCT/JP2017/016103
§ 371 (c)(1),
(2) Date: Nov. 8, 2018

(87) PCT Pub. No.: WO2017/195577
PCT Pub. Date: Nov. 16, 2017

(65) Prior Publication Data
US 2019/0175302 A1    Jun. 13, 2019

(30) Foreign Application Priority Data
May 12, 2016   (JP) .................................. 2016-096070

(51) Int. Cl.
*A61C 1/18*     (2006.01)
*A61C 19/00*    (2006.01)
(Continued)

(52) U.S. Cl.
CPC ................ *A61C 1/181* (2013.01); *A61C 1/08* (2013.01); *A61C 3/00* (2013.01); *A61C 19/00* (2013.01);
(Continued)

(58) Field of Classification Search
CPC ......... A61C 19/00; A61C 19/002; A61C 1/08; A61C 1/181; A61C 2204/005; A61C 3/00
See application file for complete search history.

(56) References Cited

U.S. PATENT DOCUMENTS 4,544,355 A   10/1985  Eibofner et al.
6,217,329 B1  4/2001   Eibofner et al.
(Continued)

FOREIGN PATENT DOCUMENTS

| JP | 2005-131388 | 5/2005 |
| JP | 2006-288725 | 10/2006 |
| JP | 2015-142690 | 8/2015 |

OTHER PUBLICATIONS

International Search Report for PCT/JP2017/016103, dated Jul. 25, 2017.

*Primary Examiner* — Sisay Yacob
(74) *Attorney, Agent, or Firm* — Steven M. Greenberg, Esq.; Shutts & Bowen LLP

(57) ABSTRACT

A lubrication information management device includes: a lubrication detector provided to a lubrication unit; an instrument wireless tag provided to an instrument; and a read-write unit which is either an antenna or a reader-writer. Moreover, the read-write unit communicates lubrication information to the instrument wireless tag when the lubrication detector detects any of lubrication of the instrument and an operation for lubrication. This makes it possible to reliably manage the lubrication of a dental instrument.

10 Claims, 14 Drawing Sheets

(51) Int. Cl.
*A61C 3/00* (2006.01)
*A61C 1/08* (2006.01)

(52) U.S. Cl.
CPC ...... *A61C 19/002* (2013.01); *A61C 2204/005* (2013.01)

(56) References Cited

U.S. PATENT DOCUMENTS

| 2004/0209223 | A1 | 10/2004 | Beier et al. |
| 2012/0048883 | A1 | 3/2012 | Heckenberger et al. |
| 2012/0298151 | A1* | 11/2012 | Heckenberger ........... A61L 2/07 134/94.1 |
| 2012/0301369 | A1* | 11/2012 | Heckenberger ........... A61L 2/24 422/300 |
| 2015/0377969 | A1* | 12/2015 | Muto ................... G01R 31/343 324/765.01 |

* cited by examiner

LUBRICATION INFORMATION MANAGEMENT DEVICE FOR DENTISTRY

CROSS-REFERENCE TO RELATED APPLICATIONS

This application is a § 371 national phase entry of International Application No. PCT/JP2017/016103, filed Apr. 21, 2017, which claims priority to Japanese Patent Application No. 2016-096070, filed May 12, 2016.

TECHNICAL FIELD

The present invention relates to a lubrication information management device which manages lubrication information concerning lubrication of a dental instrument.

BACKGROUND ART

A rotation mechanism such as a bearing is built in a dental instrument like an air turbine handpiece or a micromotor handpiece, which represents a treatment tool used in dental treatments. In order to prevent the rotation mechanism from wearing and from a failure due to adhesion of debris, a joint part on a base end side of the dental instrument is lubricated regularly.

In the meantime, a chuck part for attaching a bur used for grinding teeth is provided on a tip end side of the air turbine handpiece among such dental instruments. To keep the chuck part out of debris and wearing and thus to avoid trouble such as loosening or falling off of the bur, the chuck part on the tip end side of the air turbine handpiece is lubricated regularly.

Concerning the lubrication of a dental instrument, Patent Literature 1 discloses that "a reader-writer 321 is provided in the vicinity of a lubricator 320, and reads recorded information from a wireless tag T provided to a handpiece 111" and that "management means 180 records the number of times of reading each piece of identification information on the corresponding handpiece 111 with the reader-writer 321, in management information storage means 190 as the number of times of a lubrication operation on the handpiece 111 based on the identification information on the handpiece 111" (see paragraphs [0066] and [0067]).

CITATION LIST

Patent Literature

Patent Literature 1: JP 2015-142690 A

SUMMARY OF INVENTION

Technical Problem

However, the technique disclosed in Patent Literature 1 is not designed to recognize execution of the lubrication based on an actual lubrication operation. In other words, according to the technique disclosed in Patent Literature 1, execution of the lubrication is recognized by reading the identification information from the wireless tag on the handpiece (the dental instrument) as a consequence of bringing the dental instrument close to the reader-writer provided in the vicinity of the lubricator.

Accordingly, even if the lubrication does not actually take place, execution of a lubrication operation may be erroneously recognized just by bringing the dental instrument close to the lubricator. In the meantime, a user has to consciously perform an action to bring the dental instrument close to the reader-writer before and after each time of the lubrication operation, for example. For this reason, a failure to read and write lubrication information may arise in case of forgetting to bring the dental instrument close to the reader-writer. As described above, there has been room for further improvement concerning management of lubrication of a dental instrument.

The present invention has been made in view of the above-mentioned circumstances. An object of the present invention is to provide a lubrication information management device, which is capable of reliably managing lubrication of a dental instrument.

Solution to Problem

To solve the above-mentioned problem, the present invention provides a lubrication information management device which manages lubrication information concerning lubrication of a dental instrument, which includes: a lubrication detector provided to a lubrication unit to lubricate the dental instrument and to detect any of lubrication of the dental instrument or an operation for lubrication; an instrument wireless tag provided to the dental instrument and in which identification information on the dental instrument is written in advance; and a read-write unit being any of an antenna or a reader-writer provided to the lubrication unit. Here, the read-write unit communicates the lubrication information to the instrument wireless tag when the lubrication detector detects any of the lubrication of the dental instrument or the operation for lubrication.

According to the above-described configuration, it is possible to read and/or write (hereinafter also referred to as "to conduct read and write") necessary lubrication information out of and in the instrument wireless tag provided to the dental instrument only at the time of the lubrication of the dental instrument. Hence, it is possible to prevent erroneous read and write involving the instrument wireless tag of the dental instrument which does not actually undergo the lubrication.

Furthermore, the read and write of the lubrication information is conducted automatically as a consequence of detection of the lubrication or the operation for lubrication by the lubrication detector. Accordingly, a user such as a doctor at a dental clinic does not have to consciously perform an action to bring the dental instrument close to the read-write unit before and after the lubrication, for example, so as to cause the read-write unit to execute the read and write. Moreover, it is also possible to prevent forgetting to conduct the read and write of the necessary lubrication information.

In other words, it is possible to provide the lubrication information management device which is capable of reliably managing the lubrication of the dental instrument.

Meanwhile, by installing the read-write unit which is either the antenna or the reader-writer at a dental unit (a dental treatment device), it is possible to confirm a situation of lubrication with a display device of the dental unit and the like before using the dental instrument.

In the lubrication information management device, the lubrication unit preferably includes a container containing a lubricant, and the lubrication detector is preferably any of a sensor to detect movement of an operating part used to operate the lubrication, or a sensor to detect any of a pressure and a flow volume of the lubricant.

According to the above-described configuration, it is possible to adopt a simple and compact configuration by employing a container such as a spray can that has long been used for lubrication of dental instruments.

In the lubrication information management device, the lubrication unit is preferably any of a lubrication device to lubricate a plurality of the dental instruments at the same time, or a lubrication sterilization device to lubricate the dental instrument and to sterilize the dental instrument. Moreover, the lubrication detector preferably detects any of a signal to instruct the lubrication unit to lubricate the dental instrument, or a sensor to detect any of a pressure and a flow volume of the lubricant from the lubrication unit.

According to the above-described configuration, even when the lubrication of the plurality of the dental instruments is executed at a time or when the lubrication of the dental instrument is executed in conjunction with processing of a different kind, lubrication of each instrument 110 can be reliably managed by adopting the lubrication information management device. Thus, it is possible to conduct the processing including the lubrication on the dental instruments efficiently.

In the lubrication information management device, the lubrication information preferably contains a lubrication history including at least one of the number of times of a lubrication operation on the dental instrument, and date and hour of each time of the lubrication operation.

The above-described configuration makes it possible to grasp the lubrication history of the dental instrument at any time. Accordingly, it is possible to manage maintenance of each dental instrument, for example.

In the lubrication information management device, the read-write unit is preferably connected to a communication network so as to communicate the lubrication information to an information processing device connected to the communication network.

According to the above-described configuration, the information processing device on the communication network can grasp the situation of lubrication of the dental instrument. Moreover, the lubrication information concerning the lubrication of the dental instrument can also be saved in the information processing device. As a consequence, regarding the lubrication of the dental instrument, a variety of information concerning maintenance, failures, advice, and the like can be obtained from the information processing device.

In the lubrication information management device, the lubrication unit preferably includes a container containing a lubricant, and multiple types of nozzles each being interchangeably provided to the container and corresponding to any type of the dental instrument and a location for lubrication in the dental instrument. Moreover, it is preferable that each nozzle be provided with a nozzle wireless tag in which identification information on the nozzle is written in advance, and that the read-write unit communicate the lubrication information to the instrument wireless tag and with the nozzle wireless tag when the lubrication detector detects any of the lubrication of the dental instrument or the operation for lubrication.

According to the above-described configuration, the read-write unit reads the instrument wireless tag and the nozzle wireless tag simultaneously at the time of lubrication. Thus, the read-write unit can grasp which dental instrument is lubricated (grasp its type from identification information on the dental instrument) and grasp which part thereof is lubricated (grasp a location for lubrication in the dental instrument from identification information on the nozzle).

Then, the read-write unit can write the lubrication information including the grasped information and the like in the instrument wireless tag. Thus, it is possible to manage the lubrication of the dental instrument more reliably.

In addition, it is possible to grasp wear of the nozzle and the like by causing the read-write unit to write a usage history in the nozzle wireless tag at the time of lubrication.

In the lubrication information management device, it is preferable that a plurality of the read-write units be deployed separately from one another, and that the read-write unit among the read-write units which is located closest to the instrument wireless tag at the time of lubrication communicates the lubrication information to the instrument wireless tag.

According to the above-described configuration, the read-write unit that communicates with the instrument wireless tag is the read-write unit closest to the instrument wireless tag. Here, an orientation of installation of the dental instrument changes depending on whether the location for lubrication in the dental instrument is on a tip end side or a base end side, and a position of the instrument wireless tag changes accordingly. Therefore, the instrument wireless tag is read during the lubrication and it is recognized which one of the multiple read-write units successfully communicates with the instrument wireless tag at the same time. In this way, it is possible to grasp which dental instrument is lubricated and which part thereof is lubricated.

In the lubrication information management device, the lubrication unit preferably includes a container containing a lubricant, multiple jet ports connected to the container, and multiple types of nozzles connected to the multiple jet ports, respectively, and each corresponding to any type of the dental instrument and a location for lubrication in the dental instrument. Moreover, a plurality of the lubrication detectors are preferably provided to the multiple jet ports, respectively.

According to the above-described configuration, the read-write unit reads the instrument wireless tag at the time of the lubrication. Moreover, the location for lubrication in the dental instrument is recognized based on the type of the nozzle connected to the jet port provided with the lubrication detector that detects a lubrication operation. Thus, it is possible to grasp which dental instrument is lubricated and which part thereof is lubricated.

Moreover, the user can save the trouble of interchanging the nozzles, which is required every time the type of the dental instrument targeted for lubrication is changed. Therefore, efficiency of the lubrication work is increased.

In the lubrication information management device, when the dental instrument targeted for lubrication is determined to have two locations for lubrication on a tip end side and a base end side as a consequence of reading the instrument wireless tag, the read-write unit preferably writes a lubrication history, which includes at least one of the number of times of a lubrication operation on the dental instrument and date and hour of each time of the lubrication operation, in the instrument wireless tag when the dental instrument is lubricated twice.

According to the above-described configuration, when the dental instrument targeted for lubrication has the two locations for lubrication on the tip end side and the base end side like an air turbine handpiece, for instance, it is possible to determine that one session of lubrication work is completed when the lubrication operation is carried out twice, and hence to write the lubrication history in the instrument wireless tag. Here, the air turbine handpiece, for example, needs to be lubricated at both of the locations for lubrication, namely, a joint part on the base end side and a chuck part on the tip end side. For this reason, by recognizing the completion of one session of lubrication work after the lubrication operation on both of the locations for lubrication, it is possible to confirm the lubrication operation on both of the locations for lubrication with one lubrication history. In this way, the lubrication of the dental instrument having the two locations for lubrication on the tip end side and the base end side like the air turbine handpiece, for example, can be reliably managed by using a simple configuration.

In the lubrication information management device, the lubrication unit preferably includes a nozzle to be connected to a location for lubrication on a tip end side of the dental instrument and a nozzle to be connected to a location for lubrication on a base end side of the dental instrument in a state of setting the dental instrument targeted for lubrication and having the two locations for lubrication on the tip end side and the base end side. Moreover, when the dental instrument targeted for lubrication is determined to have the two locations for lubrication on the tip end side and the base end side as a consequence of reading the instrument wireless tag, the read-write unit preferably writes a lubrication history, which includes at least one of the number of times of a lubrication operation on the dental instrument and date and hour of each time of the lubrication operation, in the instrument wireless tag when the two locations for lubrication in the dental instrument are lubricated.

According to the above-described configuration, if the dental instrument targeted for lubrication has the two locations for lubrication on the tip end side and the base end side like the air turbine handpiece, for instance, then it is possible to reduce the occurrence of a situation where only one of the locations is lubricated. Moreover, when both of the two locations for lubrication in the dental instrument are lubricated, it is possible to determine that one session of the lubrication work is completed and to write the lubrication history in the instrument wireless tag. Thus, it is possible to more reliably manage the lubrication of the dental instrument having the two positions of lubrication on the tip end side and the base end side like the air turbine handpiece, for instance.

In the meantime, the user can lubricate both of the two locations for lubrication in the dental instrument at the same time. Thus, the efficiency of the lubrication work is increased. Moreover, since the lubrication is conducted by setting the dental instrument to the lubrication unit, it is possible to achieve uniform lubrication irrespective of work proficiency of the user.

Advantageous Effects of Invention

According to the present invention, it is possible to provide a lubrication information management device which is capable of reliably managing lubrication of a dental instrument.

DESCRIPTION OF EMBODIMENTS

Embodiments of the present invention will be described in detail with reference to the accompanying drawings as appropriate.

Note that constituents in common and similar constituents throughout the drawings will be denoted by the same reference signs and overlapping explanations thereof will be omitted.

First Embodiment

A first embodiment of the present invention will be described with reference to FIGS. 1 to 4 to begin with.

Figure 1:
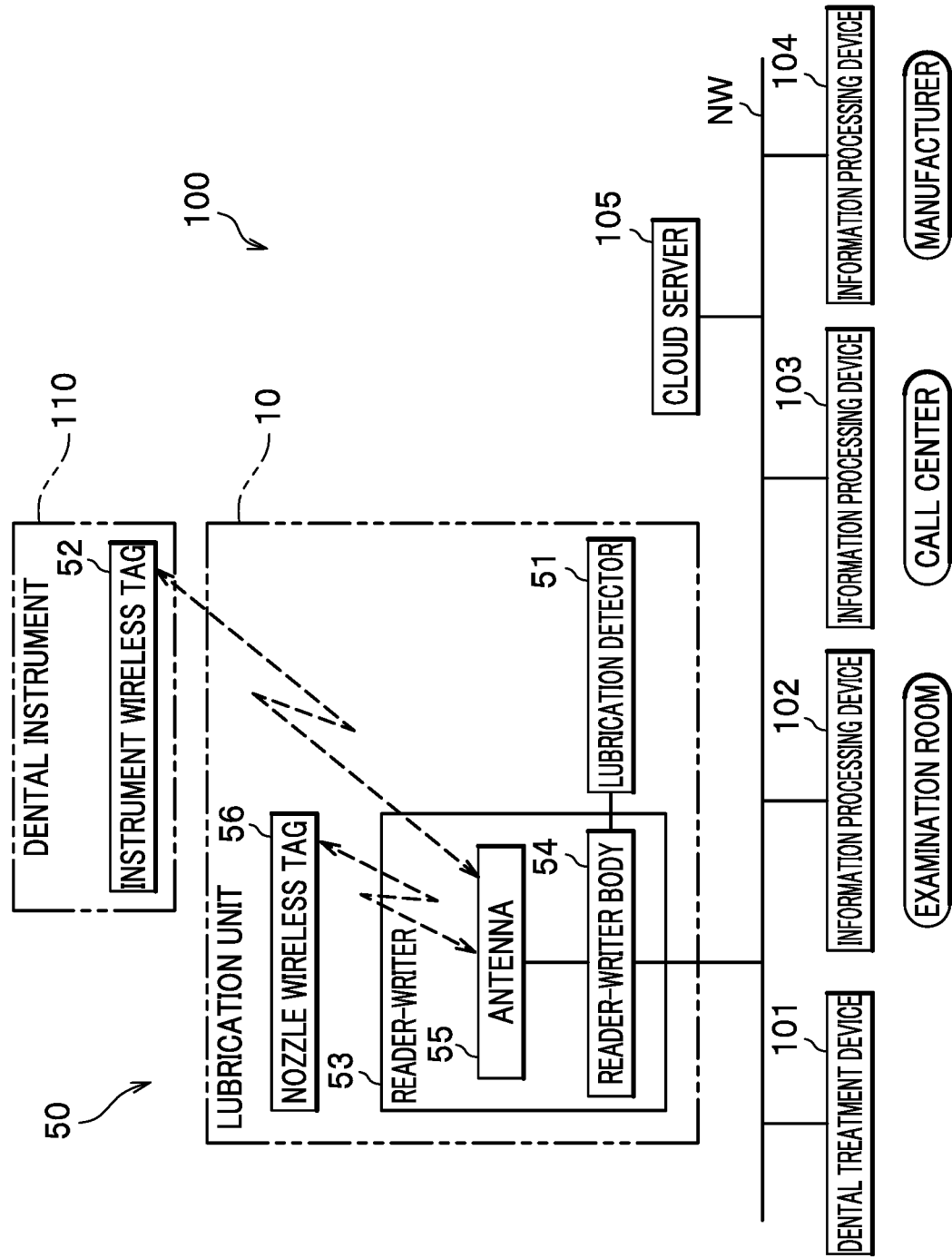
FIG. 1 is a block diagram schematically showing a dental treatment system adopting a lubrication information management device according to a first embodiment of the present invention.
Figure 2:
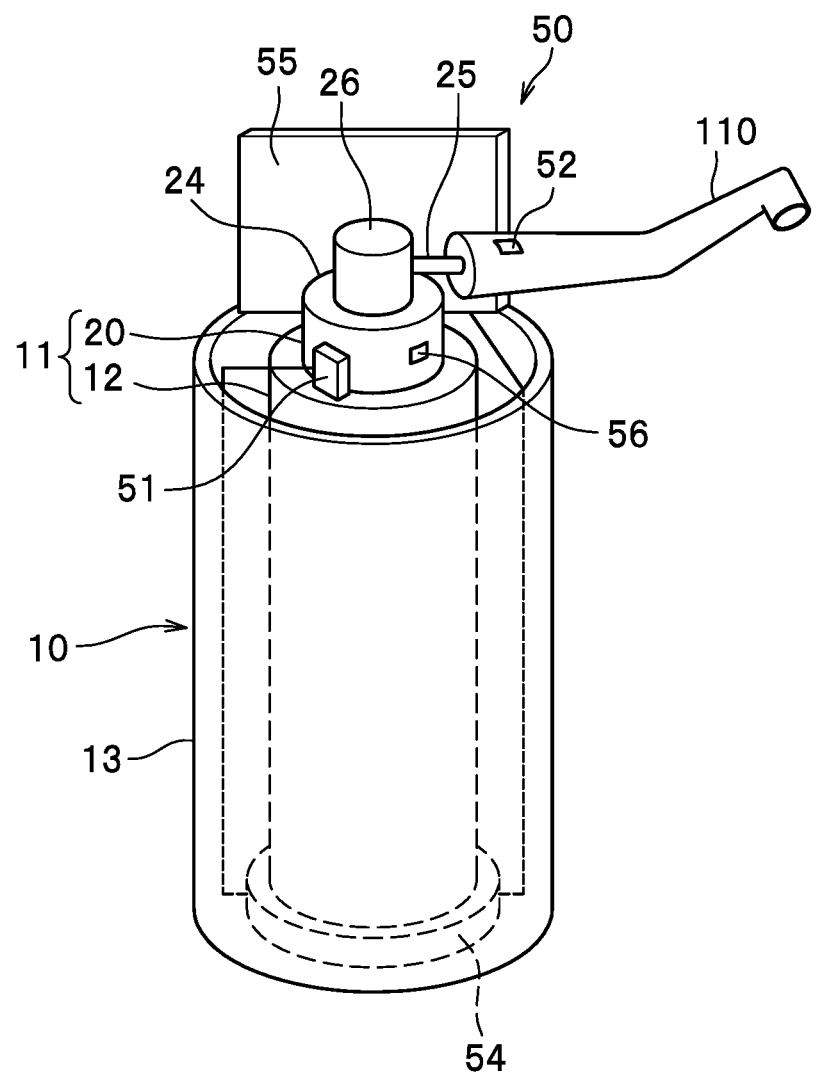
FIG. 2 is a perspective view schematically showing a lubrication unit at the time of lubrication of a dental instrument.
Figure 3A:
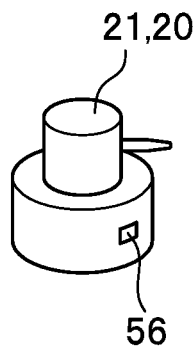
FIGS. 3A to 3C are perspective views schematically showing nozzles to be interchangeably attached to a container of the lubrication unit.
Figure 3B:
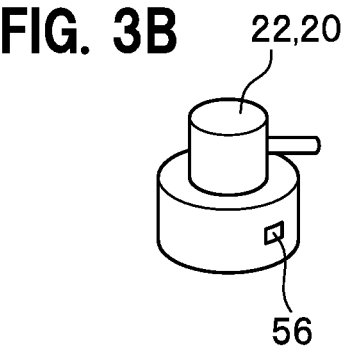
Figure 3C:
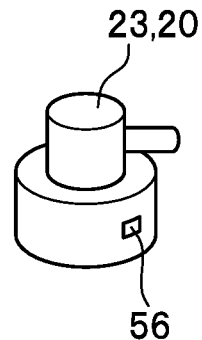

FIG. 1 is a block diagram schematically showing a dental treatment system 100 adopting a lubrication information management device 50 according to a first embodiment of the present invention. FIG. 2 is a perspective view schematically showing a lubrication unit 10 at the time of lubrication of a dental instrument (hereinafter also simply referred to as an "instrument") 110. FIGS. 3A to 3C are perspective views schematically showing nozzles 21 to 23 to be interchangeably attached to a container 12 of the lubrication unit 10.

As shown in FIG. 1, the dental treatment system 100 includes at least one dental treatment device 101 installed at a treatment room in a dental clinic. Moreover, the dental treatment system 100 includes the lubrication unit 10 to lubricate the instrument 110 which is a treatment tool used for dental treatments. The lubrication unit 10 is installed either in the treatment room or in a different room.

The dental treatment device 101 is a device used for subjecting a patient to a dental treatment, which mainly includes a unit body, a table on the unit body, a hanger provided to the unit body, a patient chair, and the like (none of which is illustrated). The hanger of the dental treatment device 101 is capable of holding the plurality of instruments 110.

Here, a description will be given of the case in which an air turbine handpiece and a micromotor handpiece are used as the instruments 110. The air turbine handpiece is designed to grind a tooth by rotating a cutting tool at a high speed by use of a force of compressed air with water sprayed on the cutting tool. On the other hand, the micromotor handpiece is designed to grind a tooth by rotating a cutting tool at a high speed by use of a force of an electric motor with water sprayed on the cutting tool. However, other types of instruments such as an airmatic handpiece driven by an air motor may be used herein.

The lubrication information management device 50 of this embodiment is a device which manages lubrication information concerning lubrication of the instruments 110. Here, the lubrication of the instruments 110 is assumed to include three types of lubrication operations, namely, lubrication of a chuck part on a tip end side of the air turbine handpiece used to attach a bur, lubrication of a joint part on a base end side of the air turbine handpiece, and lubrication of a joint part on abase end side of the micromotor handpiece.

As shown in FIG. 2, the lubrication unit 10 includes the container 12 that contains a lubricant, and a spray can 11 attached to the container 12 and provided with a nozzle 20 to jet the lubricant in the container 12 to the outside. Moreover, the lubrication unit 10 includes a holder 13 in a bottomed cylindrical shape, for instance, to allow the spray can 11 to be placed and held therein.

The nozzle 20 includes a connector cap 24 to be attached to an upper part of the container 12, and a jet pipe 25 provided continuously with the connector cap 24 so as to jet the lubricant. A jet button 26 is provided at an upper part of the connector cap 24 so as to allow a user to press the jet button (an operating part) 26 to jet the lubricant in the container 12.

As shown in FIG. 3, this embodiment prepares multiple types of nozzles 21 to 23 corresponding to the aforementioned types of the lubrication operations (the types of the instruments 110 and locations for lubrication in the instruments 110). Specifically, the nozzle 21 (see FIG. 3A) is used for lubrication of the chuck part on the tip end side of the air turbine handpiece. The nozzle 22 (see FIG. 3B) is used for lubrication of the joint part on the base end side of the air turbine handpiece. The nozzle 23 (see FIG. 3C) is used for lubrication of the joint part on the base end side of the micromotor handpiece.

Note that the nozzles 21 to 23 will be collectively referred to as the nozzles 20.

As shown in FIGS. 1 and 2, the lubrication information management device 50 includes a lubrication detector 51, an instrument wireless tag 52, and a reader-writer 53.

The lubrication detector 51 is provided to the lubrication unit 10 so as to detect lubrication of a dental instrument or an operation for lubrication. Here, a sensor which detects movement of the jet button 26 for operating lubrication from the spray can 11 through a component (not shown) that interlocks with the jet button 26 when the jet button 26 is pressed is used as the lubrication detector 51. In addition to a micro switch, it is possible to use, for example, an optical sensor, an infrared sensor, a capacitance sensor, a magnetic sensor, a reflective sensor, a transmissive sensor, and the like as the sensor to detect the movement of the jet button 26. However, the lubrication detector 51 is not limited to the sensor to detect the movement of the jet button 26, but may also be a sensor to detect a pressure or a flow volume of the lubricant from the spray can 11, for example.

The instrument wireless tag 52 is provided on an outer surface on the base end side of the instrument 110, for example. At least identification information on the instrument 110 is written in this instrument wireless tag 52 in advance. The identification information on the instrument 110 includes a type of the instrument 110 (such as information indicating that the instrument is an air turbine handpiece).

The instrument wireless tag 52 is a non-contact electronic tag that uses wireless communication, and includes an IC chip provided with a storage unit, and an antenna formed from a coil (none of which is shown). An RFID tag, for example, can be used as the instrument wireless tag 52.

The reader-writer 53 includes a reader-writer body 54 provided with a control unit (not shown), and an antenna 55 connected to the reader-writer body 54. In the example of FIG. 2, the reader-writer body 54 is installed at a bottom part in the holder 13, and the antenna 55 is installed on an open edge part of the holder 13.

Note that locations to install the reader-writer body 54 and the antenna 55 are not limited to the above-mentioned locations (the same applies to other embodiments to be described later). For example, the reader-writer body 54 may be provided on the outside away from the lubrication unit 10. Alternatively, the reader-writer formed by integrating the reader-writer body 54 and the antenna 55 together may be installed at a location, for example, on the open edge part of the holder 13 where the reader-writer can communicate with the wireless tag.

The lubrication detector 51 is connected to the reader-writer 53. When the lubrication of the dental instrument or the operation for lubrication is detected by the lubrication detector 51, a detection signal thereof is to be inputted to the reader-writer 53.

When the instrument wireless tag 52 receives an electromagnetic wave emitted from the reader-writer 53, a current flows on the instrument wireless tag 52 due to an electromagnetic induction action. In this way, the instrument wireless tag 52 is capable of performing wireless communication with the reader-writer 53 and performing the read and write of a variety of information including the lubrication information concerning lubrication of the instrument 110. Here, the lubrication information contains a lubrication history that includes at least one of the number of times of a lubrication operation and date and hour of each time of the lubrication operation on the instrument 110.

As shown in FIGS. 1 to 3C, in this embodiment, the lubrication information management device 50 further includes a nozzle wireless tag 56. The nozzle wireless tag 56 is provided to each of the multiple types of nozzles 20 (21 to 23). At least identification information on the corresponding nozzle 20 is written in this nozzle wireless tag 56 in advance. The identification information on the nozzle 20 includes the type of the corresponding nozzle 20 (information indicating one of the nozzles 21 to 23).

Here, a wireless tag having a similar configuration to that of the instrument wireless tag 52, for example, is used as the nozzle wireless tag 56.

As shown in FIG. 1, the reader-writer 53 is connected to a communication network NW. The communication network NW is any of a wired communication network such as a wired LAN, a wireless communication network such as a wireless LAN and Bluetooth (registered trademark), the Internet, and the like.

The above-described dental treatment device 101 and an information processing device 102 installed in the treatment room in the dental clinic are connected to the communication network NW. In addition, an information processing device 103 installed in a call center which accepts repair and maintenance work of the instruments 110, and an information processing device 104 installed in a manufacturer which manufactured the instruments 110 are connected to the communication network NW. For example, each of these information processing devices 102 to 104 may be any of a general personal computer (PC), a portable terminal device such as a tablet PC, and the like. In addition, a cloud server 105 is connected to the communication network NW.

The reader-writer 53 is capable of communicating a variety of information including the lubrication information with the dental treatment device 101, the information processing devices 102 to 104, and the cloud server 105 which are connected to the communication network NW.

An operation of the lubrication information management device 50 in the dental treatment system 100 configured as described above will be explained with reference to FIG. 4.

Figure 4:
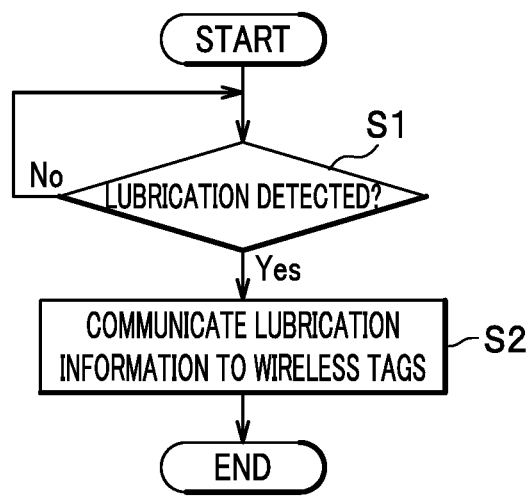
FIG. 4 is a flowchart showing outlined procedures of processing to manage lubrication information concerning lubrication of the dental instrument.

FIG. 4 is a flowchart showing outlined procedures of processing to manage the lubrication information concerning lubrication of the instrument 110.

As shown in FIG. 4, it is determined in step S1 whether or not any of the lubrication of the instrument 110 and the operation for lubrication is detected. Specifically, the reader-writer 53 determines whether or not the detection signal that indicates any of the lubrication and the operation for lubrication is received from the lubrication detector 51.

The reader-writer 53 continues to stand by when it is determined in step S1 that neither the lubrication of the instrument 110 nor the operation for lubrication is detected (no in step S1). On the other hand, the processing proceeds to step S2 when it is determined in step S1 that any of the lubrication of the instrument 110 and the operation for lubrication is detected (yes in step S1).

In step S2, the reader-writer 53 communicates the lubrication information to the wireless tags. Specifically, the reader-writer 53 communicates the lubrication information to the instrument wireless tag 52 and to the nozzle wireless tag 56.

Here, the reader-writer 53 reads the instrument wireless tag 52 and the nozzle wireless tag 56 simultaneously at the time of lubrication. Thus, the reader-writer 53 can grasp which instrument 110 is lubricated (grasp the type from the identification information on the instrument 110) and grasp which part thereof is lubricated (grasp a location for lubrication in the instrument 110 from the identification information on the nozzle 20). Then, the reader-writer 53 writes the lubrication information including the grasped information and the like in the instrument wireless tag 52.

The information read and written by the reader-writer 53 is transmitted to the dental treatment device 101, the information processing devices 102 to 104, and the cloud server 105 through the communication network NW, and is displayed on a display unit of each device or stored in a storage unit of each device.

As a consequence, a user such as a doctor at the dental clinic can display and confirm a situation of lubrication of the instrument 110 on the display unit of the dental treatment device 101 or the information processing device 102. Meanwhile, the situation of lubrication of the instrument 110 can also be displayed and confirmed by using the information processing device 103 installed at the call center and the information processing device 104 installed at the manufacturer.

For example, concerning the lubrication of the instrument 110 at the dental clinic, the manufacturer side can confirm the situation of lubrication by using the information processing device 104 or send an announcement from the information processing device 104 to be displayed on the information processing device 102 installed at the dental clinic. Here, examples of the announcement include messages such as information concerning repair and maintenance work and information concerning appropriate modes of lubrication and component replacement, and a notification like "please contact our salesperson". In addition, a serviceperson of the manufacturer or the like can grasp the situation of lubrication of the instrument 110 at the dental clinic in advance, and visit the dental clinic so as to adjust or replace a component before the occurrence of a failure. In this case, the serviceperson can prepare materials and the like necessary for the replacement prior to the visit based on the information acquired in advance.

The call center can receive a phone call from the user such as the doctor at the dental clinic when the instrument 110 causes a failure. Meanwhile, the user such as the doctor at the dental clinic can send information such as a claim from the information processing device 102 installed in the treatment room to the information processing device 103 at the call center deployed on the communication network NW. Then, the information processing device 103 at the call center can properly deal with the failure by acquiring the information from the dental treatment device 101 and the information processing device 102 at the dental clinic through the communication network NW.

Meanwhile, the situation of lubrication of the instrument 110 may be stored in and managed by the cloud server 105 deployed on the communication network NW. This makes it possible to manage the situation of lubrication of the instrument 110 constantly at various locations.

In the meantime, by grasping the situation of lubrication of the instrument 110, it is possible to change a repair charge or a guarantee period applicable to the instrument 110 depending on whether or not the lubrication is conducted as prescribed. Alternatively, it is also possible to count the frequency of lubrication of the instrument 110 and to determine a rental charge for the instrument 110 based on the counted value.

As described above, the lubrication information management device 50 of this embodiment includes the lubrication detector 51 provided to the lubrication unit 10, the instrument wireless tag 52 provided to the instrument 110, and a read-write unit which is the antenna 55 or the reader-writer 53 provided to the lubrication unit 10. Moreover, the read-write unit communicates the lubrication information to the instrument wireless tag 52 when the any of the lubrication of the instrument 110 and the operation for lubrication is detected by the lubrication detector 51.

In the above-described embodiment, it is possible to conduct the read and write of the necessary lubrication information out of and in the instrument wireless tag 52 provided to the instrument 110 only at the time of the lubrication of the instrument 110. Hence, it is possible to prevent erroneous read and write involving the instrument wireless tag 52 of the instrument 110 which does not actually undergo the lubrication.

Furthermore, the read and write of the lubrication information is conducted automatically as a consequence of detection of the lubrication or the operation for lubrication by the lubrication detector 51. Accordingly, the user such as the doctor at the dental clinic does not have to consciously perform an action to bring the instrument 110 close to the antenna 55 of the reader-writer 53 before and after the lubrication, for example, so as to cause the reader-writer 53 to execute the read and write. Moreover, it is also possible to prevent forgetting to conduct the read and write of the necessary lubrication information.

In other words, it is possible to provide the lubrication information management device 50 which is capable of reliably managing the lubrication of the instrument 110.

Meanwhile, the read-write unit which is the antenna 55 or the reader-writer 53 may be installed at a hanger provided to a dental unit (the dental treatment device 101). In this configuration, when the instrument 110 in which the lubrication information is written is held by the hanger, the read-write unit provided to the hanger confirms the lubrication information in the instrument 110 and displays the lubrication information on a display unit such as a liquid crystal display unit provided to the dental unit. In this way, a dentist can confirm the date and hour of each time of the lubrication operation and the number of times of the lubrication operation prior to a treatment.

In the meantime, according to this embodiment, the read-write unit reads the instrument wireless tag 52 and the nozzle wireless tag 56 simultaneously at the time of lubrication. Thus, the reader-writer 53 can grasp which instrument 110 is lubricated and which part thereof is lubricated. Then, the read-write unit can write the lubrication information including the grasped information and the like in the instrument wireless tag 52. Accordingly, it is possible to manage the lubrication of the instrument 110 more reliably.

In addition, it is possible to grasp wear of the nozzle 20 and the like by causing the reader-writer 53 to write a usage history in the nozzle wireless tag 56 at the time of lubrication.

Meanwhile, this embodiment can adopt a simple and compact configuration by employing a container such as the spray can 11, which has long been used for the lubrication of the instrument 110.

Moreover, according to this embodiment, the lubrication information to be written and read out contains the lubrication history that includes at least one of the number of times of the lubrication operation and the date and hour of each time of the lubrication operation on the instrument 110. This makes it possible to grasp the lubrication history of the instrument 110 at any time. Accordingly, it is possible to manage maintenance of each instrument 110, for example.

Meanwhile, according to this embodiment, each of the information processing devices 103 and 104 and the cloud server 105 on the communication network NW can grasp the situation of lubrication of the instrument 110. Furthermore, the lubrication information concerning the lubrication of the instrument 110 can also be saved in any of the information processing devices 103 and 104 and the cloud server 105. As a consequence, regarding the lubrication of the instrument 110, a variety of information concerning maintenance, failures, advice, and the like can be obtained from the information processing devices 103 and 104 and the cloud server 105.

Second Embodiment

Next, a description will be given of a second embodiment of the present invention with reference to FIGS. 5 to 8 while mainly focusing on different features from the above-described first embodiment and omitting explanations of the features in common.

Figure 5:
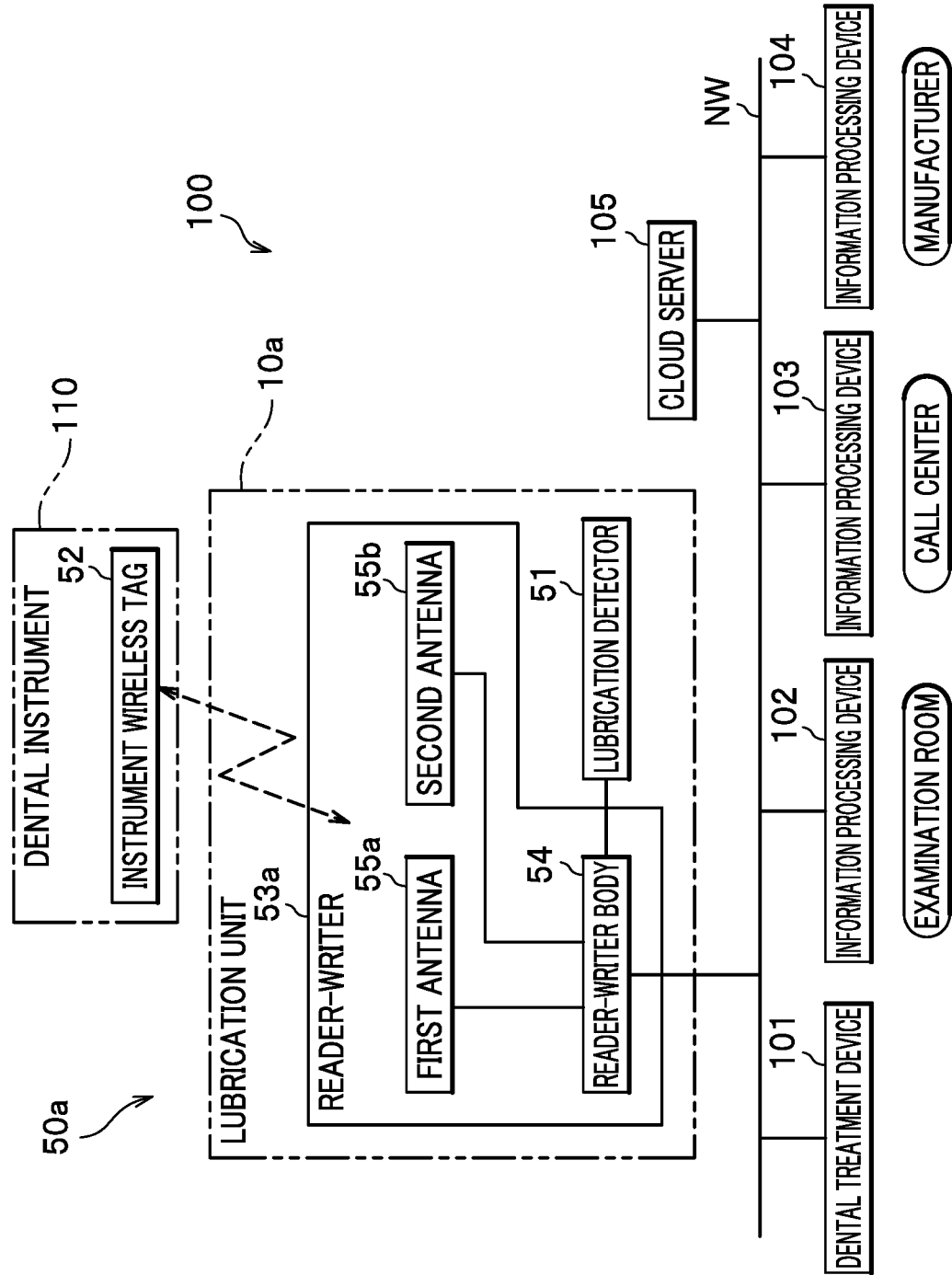
FIG. 5 is a block diagram schematically showing the dental treatment system adopting a lubrication information management device according to a second embodiment of the present invention.
Figure 6:
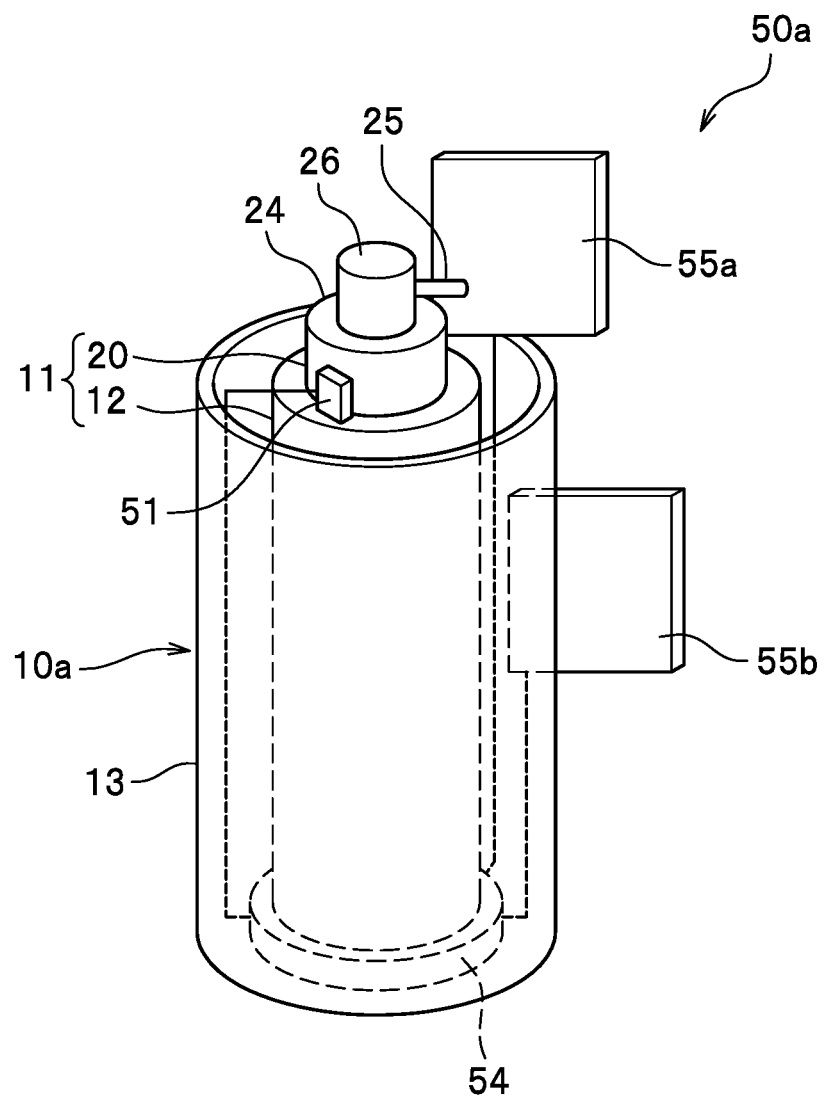
FIG. 6 is a perspective view schematically showing a lubrication unit.
Figure 7:
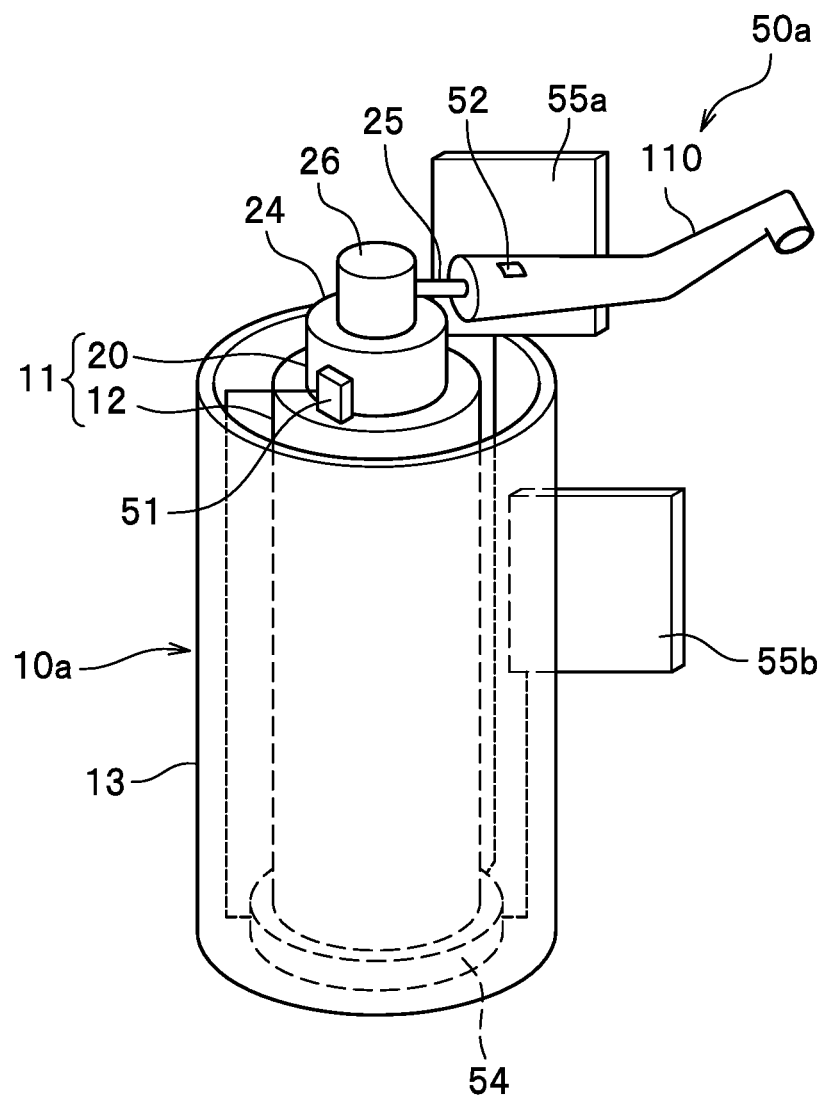
FIG. 7 is a perspective view schematically showing the lubrication unit at the time of lubrication of a joint part on a base end side of a dental instrument.
Figure 8:
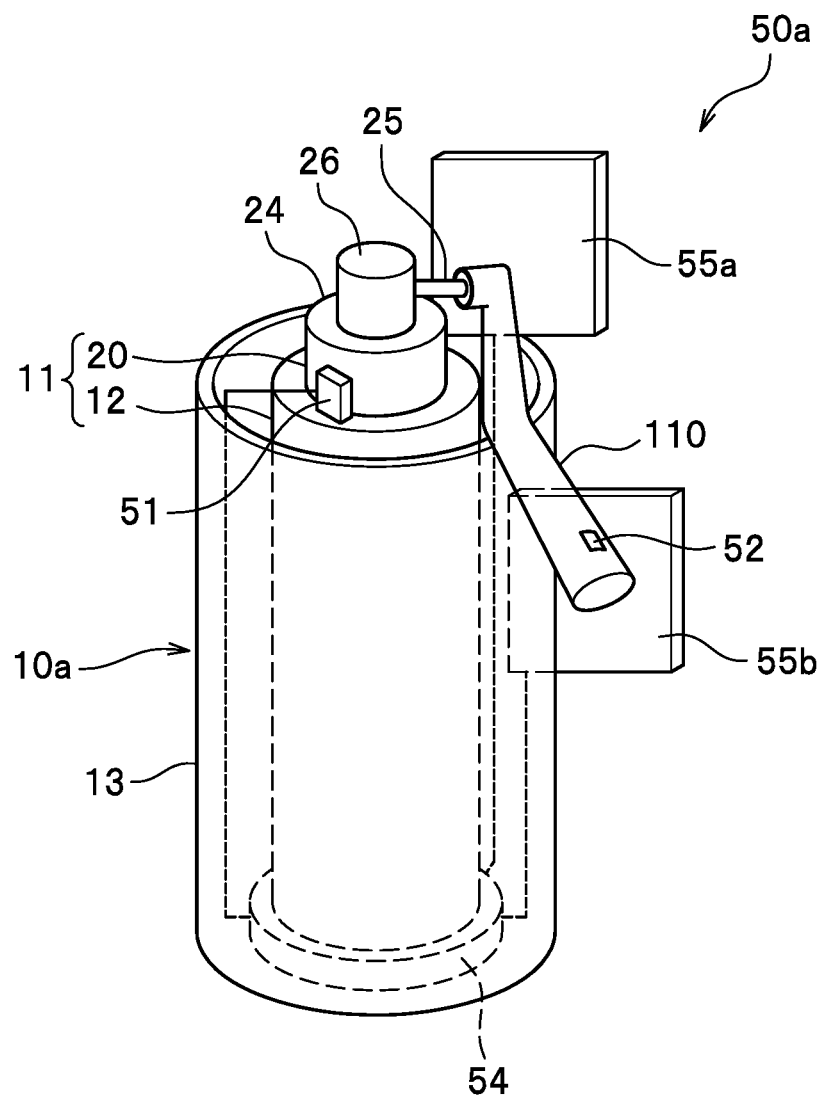
FIG. 8 is a perspective view schematically showing the lubrication unit at the time of lubrication of a chuck part on a tip end side of the dental instrument.

FIG. 5 is a block diagram schematically showing the dental treatment system 100 adopting a lubrication information management device 50*a* according to the second embodiment of the present invention. FIG. 6 is a perspective view schematically showing a lubrication unit 10*a*. FIG. 7 is a perspective view schematically showing the lubrication unit 10*a* at the time of lubrication of the joint part on the base end side of the instrument 110. FIG. 8 is a perspective view schematically showing the lubrication unit 10*a* at the time of lubrication of the chuck part on the tip end side of the instrument 110.

As shown in FIGS. 5 and 6, in the second embodiment, a reader-writer 53*a* includes multiple (which are two in this embodiment) antennas 55*a* and 55*b* deployed separately from each other at the lubrication unit 10*a*. Moreover, the reader-writer 53*a* is configured such that one of the two antennas 55*a* and 55*b* which is located closest to the instrument wireless tag 52 at the time of lubrication communicates the lubrication information to the instrument wireless tag 52. In this case, a communication distance between the instrument wireless tag 52 and any of the antennas 55*a* and 55*b* is preferably set to a relatively short distance as appropriate so as to enable only one of the antennas to perform the communication.

In the above-described configuration, the antenna that communicates with the instrument wireless tag 52 is the antenna closest to the instrument wireless tag 52. Here, the orientation of installation of the instrument 110 changes depending on whether the location for lubrication in the instrument 110 is the chuck part on the tip end side or the joint part on the base end side, and the position of the instrument wireless tag 52 changes accordingly.

To be more precise, the upper antenna 55*a* out of the two antennas 55*a* and 55*b*, which is closer to the instrument wireless tag 52, communicates the lubrication information to the instrument wireless tag 52 at the time of the lubrication of the joint part on the base end side of the instrument 110 as shown in FIG. 7. On the other hand, the lower antenna 55*b* out of the two antennas 55*a* and 55*b*, which is closer to the instrument wireless tag 52, communicates the lubrication information to the instrument wireless tag 52 at the time of the lubrication of the chuck part on the tip end side of the instrument 110 as shown in FIG. 8.

Therefore, according to the second embodiment, which one of the multiple (two in this case) antennas 55*a* and 55*b* successfully communicates with the instrument wireless tag 52 during the lubrication is recognized while reading the instrument wireless tag 52 at the same time. In this way, it is possible to grasp which instrument 110 is lubricated and which part thereof is lubricated.

Instead, multiple reader-writers each formed by integrating the reader-writer body and the antenna together may be deployed separately from one another. In this case, the system is configured such that one of the multiple reader-writers which is located closest to the instrument wireless tag 52 at the time of lubrication communicates the lubrication information to the instrument wireless tag 52.

Third Embodiment

Next, a description will be given of a third embodiment of the present invention with reference to FIGS. 9 and 10 while mainly focusing on different features from the above-described first embodiment and omitting explanations of the features in common.

Figure 9:
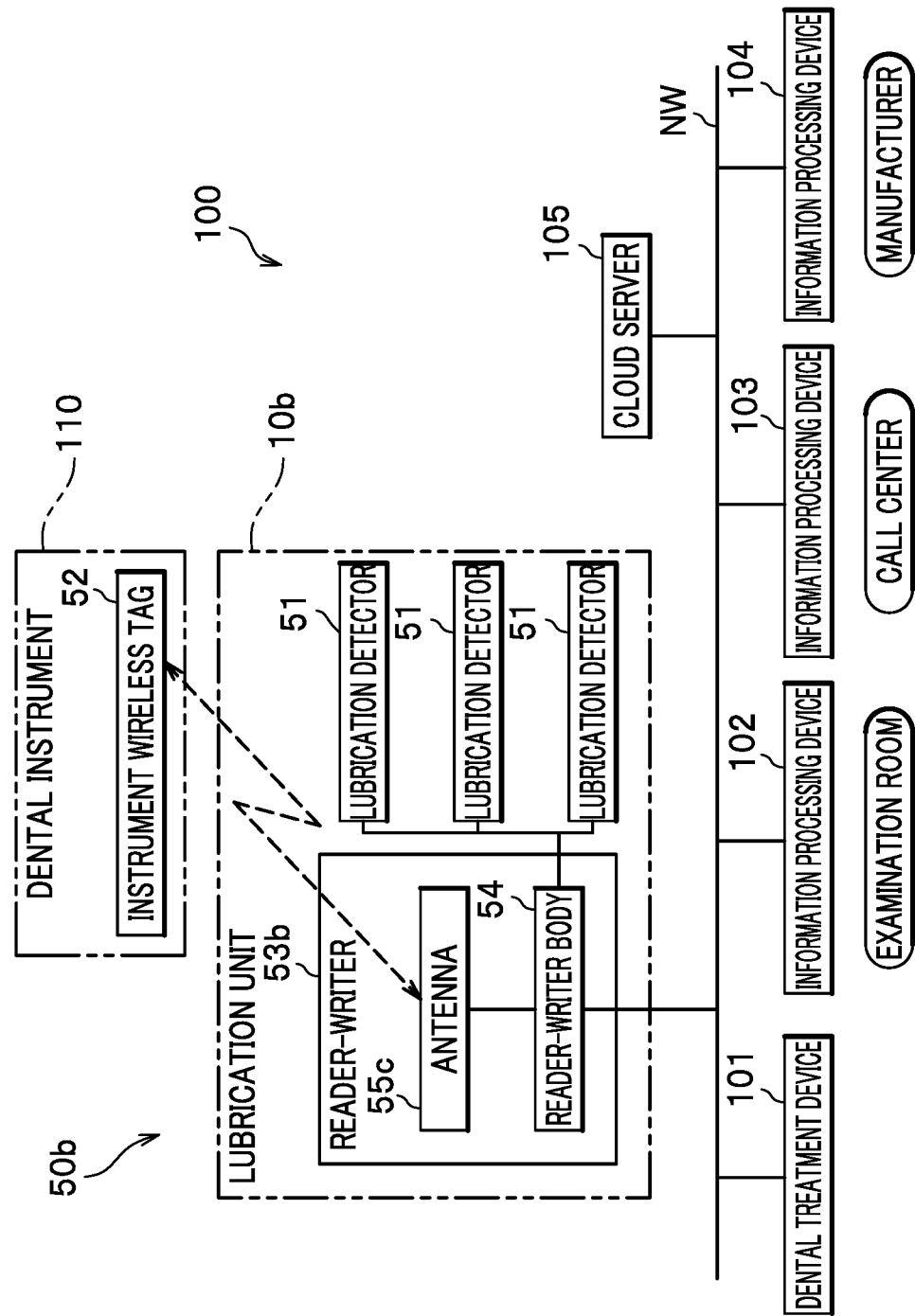
FIG. 9 is a block diagram schematically showing the dental treatment system adopting a lubrication information management device according to a third embodiment of the present invention.

FIG. 9 is a block diagram schematically showing the dental treatment system 100 adopting a lubrication information management device 50b according to the third embodiment of the present invention. FIG. 10 is a perspective view schematically showing a lubrication unit 10b.

Figure 10:
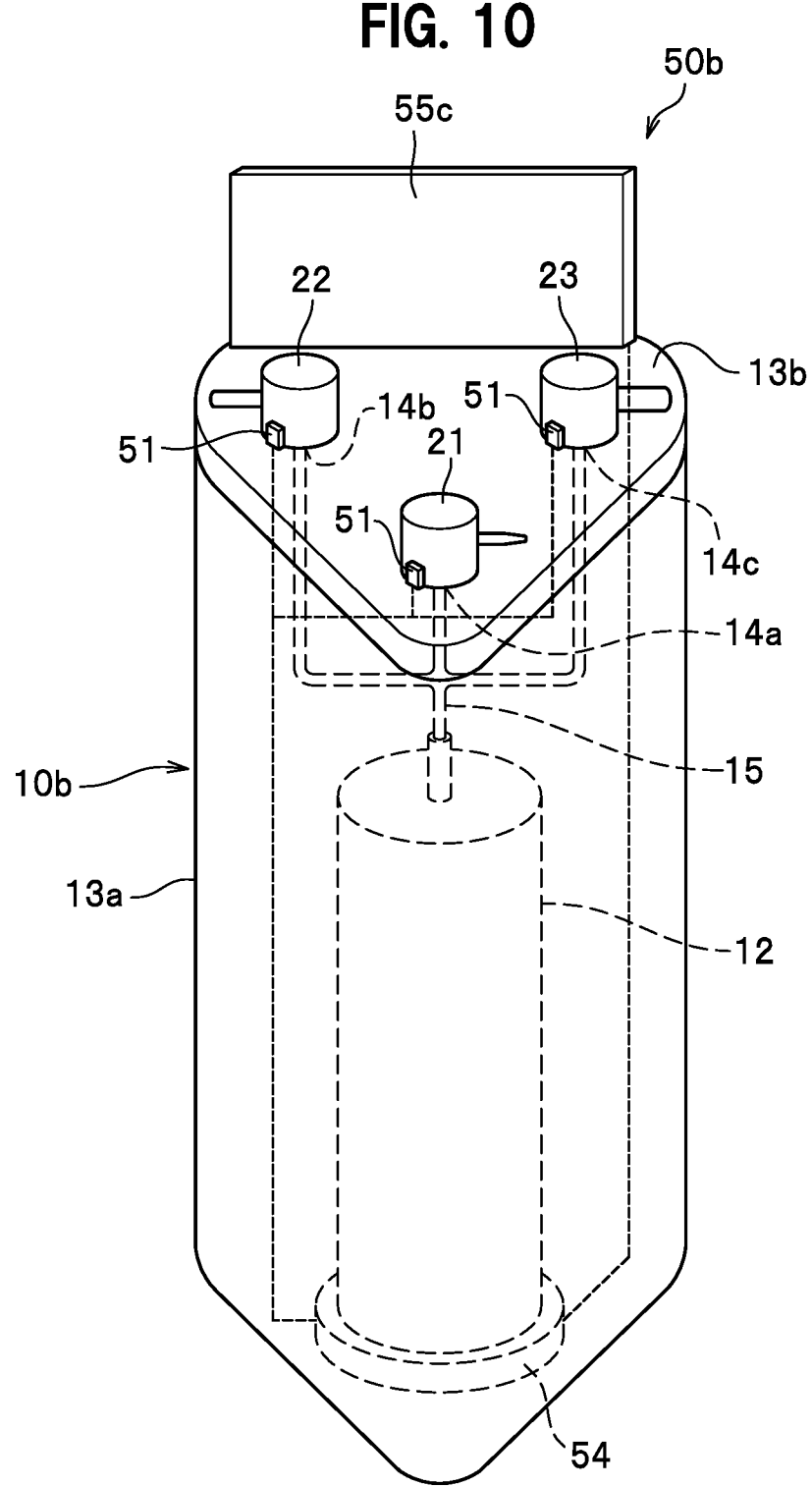
FIG. 10 is a perspective view schematically showing a lubrication unit.

As shown in FIGS. 9 and 10, in the third embodiment, the lubrication unit 10b includes the container 12 that contains the lubricant, multiple jet ports 14a, 14b, and 14c connected to the container 12 through a supply pipe 15, and the multiple types of nozzles 21 to 23 connected to the multiple jet ports 14a, 14b, and 14c, respectively.

Moreover, the lubrication unit 10b includes a holder 13a in a bottomed cylindrical shape, for instance, to allow the container 12 to be placed and held therein, and a top plate 13b that covers an upper opening of the holder 13a. The nozzles 21 to 23 are fixed and installed at substantially evenly spaced positions on the top plate 13b. An antenna 55c is installed on an edge part corresponding to one of sides of the top plate 13b having a substantially triangular shape. In this case, a communication distance between the antenna 55c and the instrument wireless tag 52 is preferably set to a relatively long distance as appropriate so as to enable the communication regardless of which one of the nozzles 21 to 23 is fitted to the instrument 110.

The multiple types of nozzles 21 to 23 are made corresponding to the above-described types of lubrication (the types of the instrument 110 and the location for lubrication in the instrument 110). Specifically, the nozzle 21 is used for lubrication of the chuck part on the tip end side of the air turbine handpiece. The nozzle 22 is used for lubrication of the joint part on the base end side of the air turbine handpiece. The nozzle 23 is used for lubrication of the joint part on the base end side of the micromotor handpiece.

Moreover, multiple lubrication detectors 51 are provided to the multiple jet ports 14a, 14b, and 14c, respectively.

According to the above-described third embodiment, the instrument wireless tag 52 is read at the time of the lubrication. Moreover, the location for lubrication in the instrument 110 is recognized based on the type of one of the nozzles 21 to 23, which are connected to the jet ports 14a, 14b, and 14c, respectively, depending on which jet port is provided with the lubrication detector 51 that detects the lubrication operation. Thus, it is possible to grasp which instrument 110 is lubricated and which part thereof is lubricated.

Moreover, the user such as the doctor at the dental clinic can save the trouble of interchanging the nozzles 21 to 23, which is required every time the type of the instrument 110 targeted for lubrication is changed as in the first embodiment. Therefore, efficiency of the lubrication work is increased.

Fourth Embodiment

Next, a description will be given of a fourth embodiment of the present invention with reference to FIGS. 11 to 12B while mainly focusing on different features from the above-described first embodiment and omitting explanations of the features in common.

Figure 11:
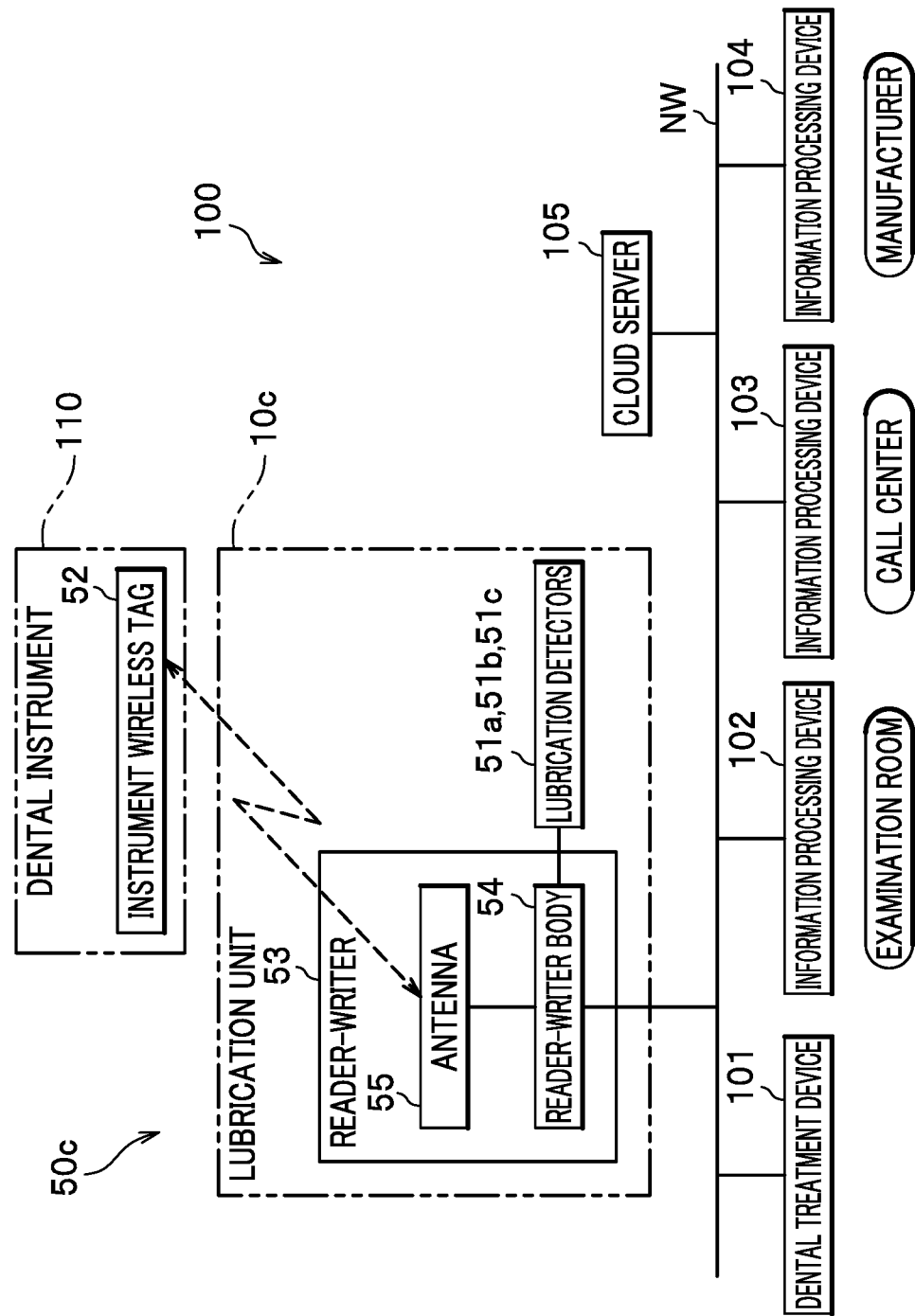
FIG. 11 is a block diagram schematically showing the dental treatment system adopting a lubrication information management device according to a fourth embodiment of the present invention.

FIG. 11 is a block diagram schematically showing the dental treatment system 100 adopting a lubrication information management device 50c according to the fourth embodiment of the present invention. FIG. 12A is a perspective view schematically showing a lubrication unit 10c at the time of lubrication of the joint part on the base end side of the instrument 110. FIG. 12B is a perspective view schematically showing the lubrication unit 10c at the time of lubrication of the chuck part on the tip end side of the instrument 110.

Figure 12:
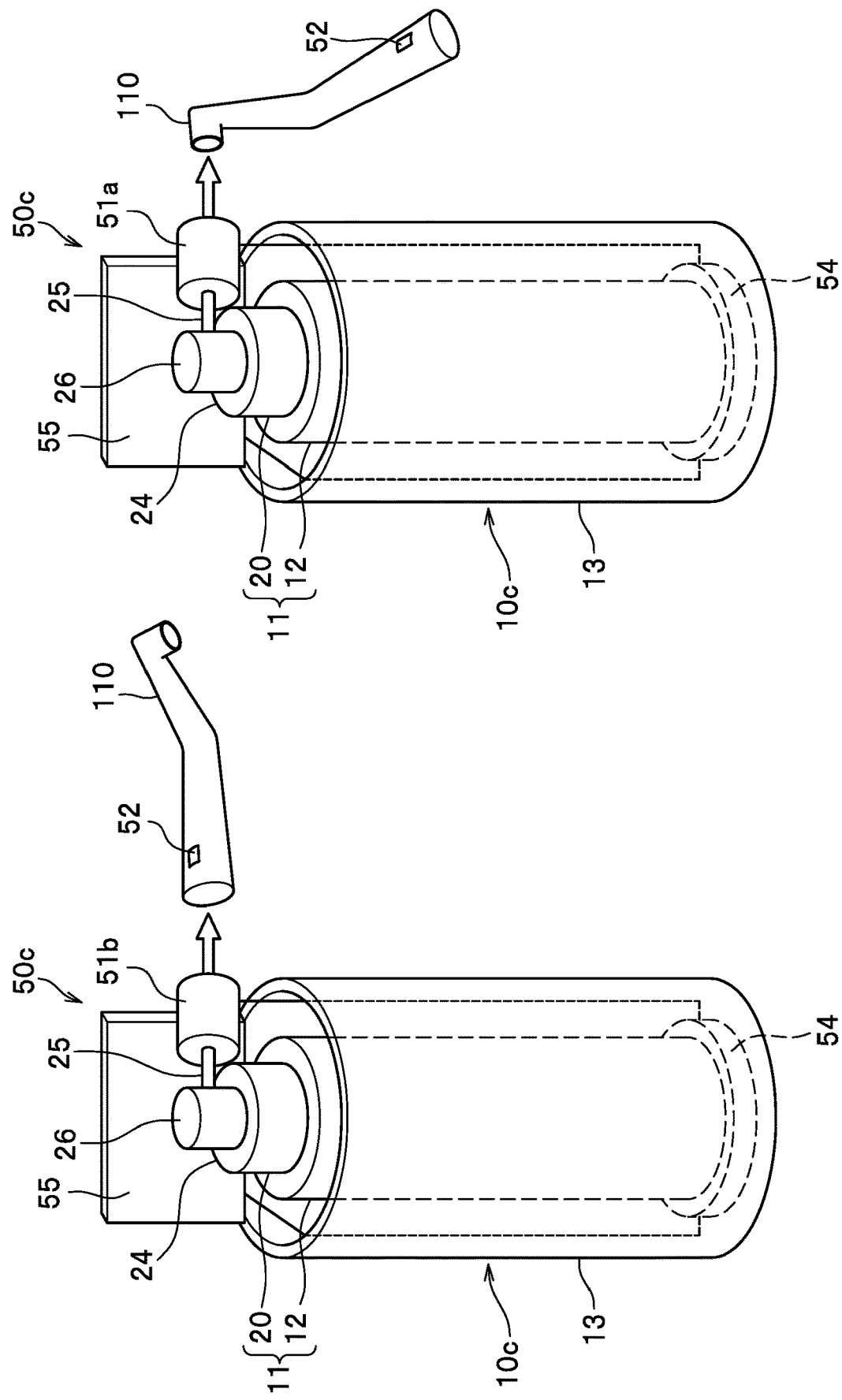
FIG. 12A is a perspective view schematically showing a lubrication unit at the time of lubrication of the joint part on the base end side of the dental instrument.
FIG. 12B is a perspective view schematically showing the lubrication unit at the time of lubrication of the chuck part on the tip end side of the dental instrument.

As shown in FIGS. 11 to 12B, the fourth embodiment prepares multiple types of the nozzles 20 corresponding to the aforementioned lubrication types (the types of the instruments 110 and the locations for lubrication in the instruments 110) as with the first embodiment. To be more precise, there are three types of the nozzles 20 as shown in FIG. 3, namely, the nozzle 21 (see FIG. 3A), the nozzle 22 (see FIG. 3B), and the nozzle 23 (see FIG. 3C).

Moreover, multiple types of lubrication detectors 51a, 51b, and 51c are provided so as to correspond to the multiple types of nozzles 20 (21 to 23), respectively. Here, a sensor to detect a pressure or a flow volume of the lubricant from the spray can 11 is used as each of the lubrication detectors 51a, 51b, and 51c. However, each of the multiple types of nozzles 20 (21 to 23) is not provided with the nozzle wireless tag 56 unlike in the first embodiment.

The fourth embodiment is configured such that, when the instrument 110 targeted for lubrication is determined to have two locations for lubrication on the tip end side and the base end side like the air turbine handpiece, for instance, by reading the instrument wireless tag 52, the read-write unit which is either the antenna 55 or the reader-writer 53 writes the lubrication history that includes at least one of the number of times of the lubrication operation and the date and hour of each time of the lubrication operation on the instrument 110 in the instrument wireless tag 52 when the instrument 110 is lubricated twice.

According to the above-described fourth embodiment, when the instrument 110 targeted for lubrication has two locations for lubrication on the tip end side and the base end side like the air turbine handpiece, for instance, it is possible to determine that one session of lubrication work is completed when the lubrication operation is carried out twice, and hence to write the lubrication history in the instrument wireless tag 52. Here, the air turbine handpiece, for example, needs to be lubricated at both of the locations for lubrication, namely, the joint part on the base end side and the chuck part on the tip end side. For this reason, by recognizing the completion of one session of lubrication work after the lubrication operation on both of the locations for lubrication, it is possible to confirm the lubrication operation on both of the locations for lubrication with one lubrication history. In this way, the lubrication of the instrument 110 having the two locations for lubrication on the tip end side and the base end side like the air turbine handpiece, for example, can be reliably managed by using the simple configuration.

Moreover, the instrument wireless tag 52 is read at the time of the lubrication, and the types of the nozzles 21 to 23 can be identified based on the types of the lubrication detectors 51a, 51b, and 51c, one of which detects the lubrication. Accordingly, the location for lubrication in the instrument 110 is recognized without having to provide each nozzle 20 with the nozzle wireless tag 56 as in the first embodiment. This makes it possible to grasp which instrument 110 is lubricated and which part thereof is lubricated.

Fifth Embodiment

Next, a description will be given of a fifth embodiment of the present invention with reference to FIGS. 13 and 14 while mainly focusing on different features from the above-described first embodiment and omitting explanations of the features in common.

Figure 13:
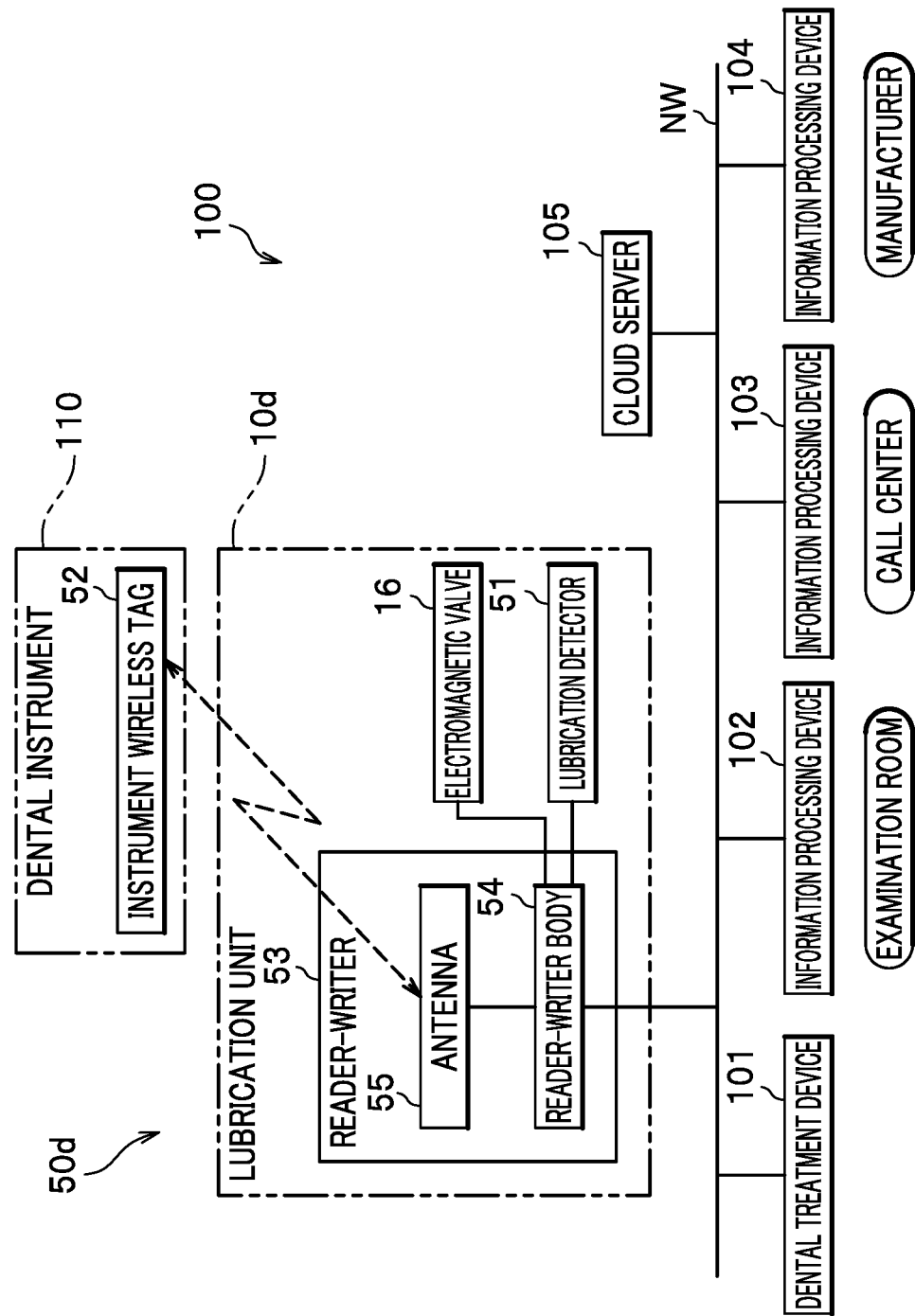
FIG. 13 is a block diagram schematically showing the dental treatment system adopting a lubrication information management device according to a fifth embodiment of the present invention.

FIG. 13 is a block diagram schematically showing the dental treatment system 100 adopting a lubrication information management device 50d according to the fifth embodiment of the present invention. FIG. 14 is a perspective view schematically showing a lubrication unit 10d at the time of lubrication of the joint part on the base end side and of the chuck part on the tip end side of the instrument 110.

Figure 14:
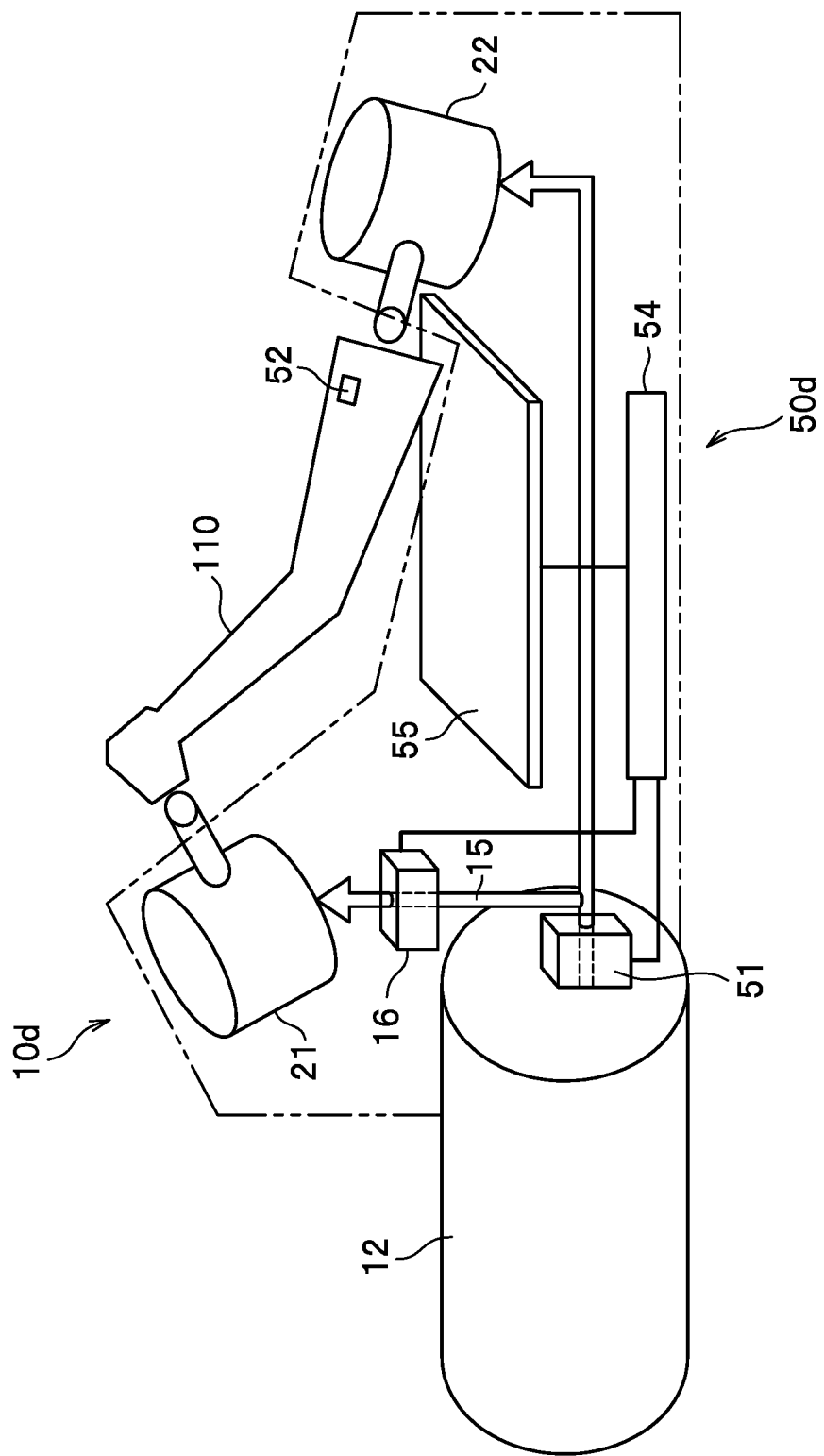
FIG. 14 is a perspective view schematically showing a lubrication unit at the time of lubrication of the joint part on the base end side and of the chuck part on the tip end side of the dental instrument.

As shown in FIG. 14, in the fifth embodiment, the lubrication unit 10d includes the nozzle 21 to be connected to the location for lubrication on the tip end side and the nozzle 22 to be connected to the location for lubrication on the base end side in the state of setting the instrument 110 that has the two locations for lubrication on the tip end side and the base end side like the air turbine handpiece, for example. The antenna 55 is located between the nozzle 21 and the nozzle 22 and below the instrument 110 in the state of being set to the lubrication unit 10d.

The lubrication unit 10d includes the container 12 that contains the lubricant. The supply pipe 15 is connected to the container 12. The supply pipe 15 that extends from the container 12 is bifurcated and connected to the nozzles 21 and 22, respectively. The lubrication detector 51 is provided on an immediately downstream side of an outlet of the container 12, for example. Here, a sensor to detect a pressure or a flow volume of the lubricant from the container 12 is used as the lubrication detector 51. Moreover, the instrument 110 is lubricated by setting the instrument 110 to the lubrication unit 10d and then manipulating a start switch (not shown).

An electromagnetic valve 16 is provided between the nozzle 21 and a bifurcation point of the supply pipe 15. The electromagnetic valve 16 is set to a normally-off state, for example. Then, the electromagnetic valve 16 is set to an open state when the instrument 110 is determined to have the two locations for lubrication on the tip end side and the base end side like the air turbine handpiece, for example. This determination is carried out by reading the instrument wireless tag 52 when the instrument 110 is set to the lubrication unit 10d. Thus, the chuck part on the tip end side can be lubricated at the same time as the lubrication of the joint part on the base end side. On the other hand, when the instrument 110 is determined to have only one location for lubrication on the base end side like the micromotor handpiece, for example, the electromagnetic valve 16 is maintained in the closed state. Thus, it is possible to carry out the lubrication of only the joint part on the base end side.

By detecting an amount of lubrication of the instrument 110 with a flowmeter as the lubrication detector 51, it is possible to confirm whether or not the lubrication is sufficiently achieved. In the case of lubrication of the air turbine handpiece, for example, it is possible to confirm that the two locations for lubrication are sufficiently lubricated when the detected amount of lubrication is about twice as large as a normal amount of lubrication corresponding to one location for lubrication.

As shown in FIGS. 13 and 14, the fifth embodiment is configured such that, when the instrument 110 targeted for lubrication is determined to have two locations for lubrication on the tip end side and the base end side like the air turbine handpiece, for instance, by reading the instrument wireless tag 52, the read-write unit which is either the antenna 55 or the reader-writer 53 writes the lubrication history that includes at least one of the number of times of the lubrication operation and the date and hour of each time of the lubrication operation on the instrument 110 in the instrument wireless tag 52 when the two locations for lubrication in the instrument 110 are lubricated.

According to the above-described fifth embodiment, if the instrument 110 targeted for lubrication has the two locations for lubrication on the tip end side and the base end side like the air turbine handpiece, for instance, then it is possible to reduce the occurrence of a situation where only one of the locations is lubricated. Moreover, when both of the two locations for lubrication in the instrument 110 are lubricated, it is possible to determine that one session of the lubrication work is completed and to write the lubrication history in the instrument wireless tag 52. As a consequence, it is possible to more reliably manage the lubrication of the instrument 110 having the two locations for lubrication on the tip end side and the base end side like the air turbine handpiece, for example.

In the meantime, the user can lubricate both of the two locations for lubrication in the instrument 110 at the same time by one action. Thus, the efficiency of the lubrication work is increased. Moreover, since the lubrication is conducted by setting the instrument 110 to the lubrication unit 10d, it is possible to achieve the uniform lubrication irrespective of work proficiency of the user.

Sixth Embodiment

Next, a description will be given of a sixth embodiment of the present invention with reference to FIG. 15 while mainly focusing on different features from the above-described first embodiment and omitting explanations of the features in common.

Figure 15:
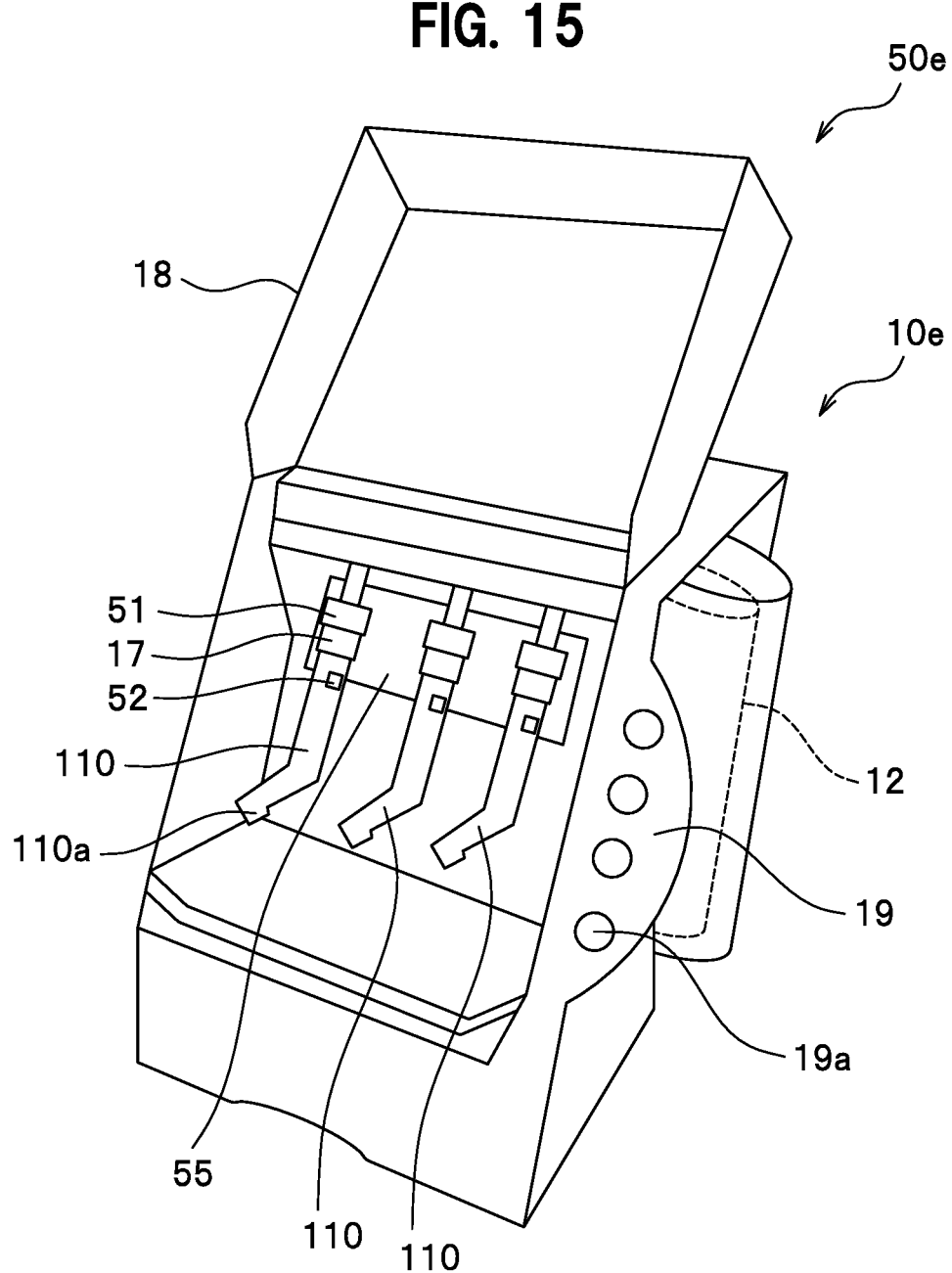
FIG. 15 is a perspective view schematically showing an aspect of lubrication of an instrument with a lubrication unit adopting a lubrication information management device according to a sixth embodiment of the present invention.

FIG. 15 is a perspective view schematically showing an aspect of lubrication of the instrument 110 with a lubrication unit 10e adopting a lubrication information management device 50e according to the sixth embodiment of the present invention.

In the above-described embodiments, each of the lubrication units 10 and 10a to 10d lubricates the instrument 110 on the one-to-one basis. In contrast, in the sixth embodiment, the lubrication unit 10e lubricates multiple instruments 110 at the same time.

As shown in FIG. 15, the container 12 containing the lubricant is detachably attached to the inside of the lubrication unit 10e. Meanwhile, there are provided pipe lines (not shown) that extend from the container 12 and branch off towards the multiple instruments 110 through an electromagnetic valve (not shown). Instrument attachment portions 17 are provided at branched end portions of the pipe lines through the intermediary of the lubrication detectors 51, respectively. The wireless tag 52 provided on each instrument 110 is made readable and writable through the antenna 55 placed on a back surface of a space in the lubrication unit 10e for installing the instruments 110.

The instruments 110 are lubricated at the same time when the user such as the doctor at the dental clinic attaches the instruments 110 onto the respective instrument attachment portions 17 of the lubrication unit 10e and presses a start switch 19a on an operation panel 19 after closing a lid 18. To be more precise, the electromagnetic valve is opened as a consequence of pressing the start switch 19a. Then, the lubricant containing a detergent passes through the lubrication detectors 51 provided at junctions with the respective instruments 110, flows into the instruments 110, and is discharged from head portions 110a thereof. Then, the lubrication is automatically stopped after performing the lubrication for a predetermined period of time. In this case, each lubrication detector 51 may be a sensor to detect a pressure or a flow volume of the lubricant, or a signal to instruct the lubrication unit 10e to lubricate any of the instruments 110. Here, the signal to instruct lubrication includes an on-signal for the start switch 19a for lubrication, and a signal to start the lubrication in the course of the sequential operation.

According to the above-described sixth embodiment, even when the lubrication of multiple pieces of the instruments 110 is executed at a time, the lubrication of the instruments 110 can be reliably managed by adopting the lubrication information management device 50e. Thus, it is possible to lubricate the instruments 110 efficiently.

While the present invention has been described above based on certain embodiments, it is to be understood that the present invention is not limited to the configurations described in the embodiments and can be modified as appropriate within the scope not departing from the gist of the invention, inclusive of combining and/or selecting certain configurations described in the embodiments as appropriate. Meanwhile, it is also possible to add, delete, or replace part of the configuration of any of the embodiments.

For example, in the embodiments described above, the lubrication units 10 and 10a to 10d merely lubricate the instruments 110. Instead, each lubrication unit may be a lubrication-sterilization device to lubricate the instrument 110 and to sterilize the instrument 110 at the same time. In this case, the lubrication detector therein is preferably a signal to instruct the lubrication unit to lubricate the instrument 110, or a sensor to detect a pressure or a flow volume of the lubricant from the lubrication unit.

This configuration can reliably manage the lubrication of the instrument 110 by adopting the lubrication information management device even when the lubrication of the instrument 110 is executed in conjunction with processing of a different kind. Thus, it is possible to efficiently conduct the processing that includes the lubrication of the instrument 110.

Meanwhile, the above embodiments have described the case of using the spray can 11. However, instead of using the spray can 11, an air pressure may be applied to a container (e.g., a bottle) filled with the lubricant.

REFERENCE SIGNS LIST 10, 10a to 10e lubrication unit
11 spray can
12 container
13, 13a holder
13b top plate
14a, 14b, 14c jet port
15 supply pipe
16 electromagnetic valve
20 nozzle
21 to 23 nozzle
24 connector cap
25 jet pipe
26 jet button
50, 50a to 50e lubrication information management device
51, 51a to 51c lubrication detector
52 instrument wireless tag
53, 53a reader-writer (read-write unit)
54 reader-writer body
55, 55a, 55b, 55c antenna (read-write unit)
56 nozzle wireless tag
100 dental treatment system
101 dental treatment device
102 to 104 information processing device
105 cloud server
110 dental instrument
NW communication network

The invention claimed is:

1. A lubrication information management device which manages lubrication information concerning lubrication of a dental instrument, comprising:
    a lubrication detector provided to a lubrication unit to lubricate the dental instrument and to detect any of lubrication of the dental instrument or an operation for lubrication;
    an instrument wireless tag provided to the dental instrument and in which identification information on the dental instrument is written in advance; and
    a read-write unit being any of an antenna or a reader-writer provided to the lubrication unit, wherein
    the read-write unit communicates the lubrication information to the instrument wireless tag when the lubrication detector detects any of the lubrication of the dental instrument or the operation for lubrication.

2. The lubrication information management device according to claim 1, wherein
    the lubrication unit includes a container containing a lubricant, and
    the lubrication detector is any of
        a sensor to detect movement of an operating part used to operate the lubrication, or
        a sensor to detect any of a pressure and a flow volume of the lubricant.

3. The lubrication information management device according to claim 1, wherein
    the lubrication unit is any of
        a lubrication device to lubricate a plurality of the dental instruments at the same time, or
        a lubrication sterilization device to lubricate the dental instrument and to sterilize the dental instrument, and
    the lubrication detector is any of
        a signal to instruct the lubrication unit to lubricate the dental instrument, or
        a sensor to detect any of a pressure and a flow volume of the lubricant from the lubrication unit.

4. The lubrication information management device according to claim 1, wherein
    the lubrication information contains a lubrication history including at least one of
        the number of times of a lubrication operation on the dental instrument, and
        date and hour of each time of the lubrication operation.

5. The lubrication information management device according to claim 1, wherein
    the read-write unit is connected to a communication network so as to communicate the lubrication information to an information processing device connected to the communication network.

6. The lubrication information management device according to claim 1, wherein
    the lubrication unit includes
        a container containing a lubricant, and a plurality of types of nozzles each being interchangeably provided to the container and corresponding to any type of the dental instrument and a location for lubrication in the dental instrument, each of the plurality of types of nozzles is provided with a nozzle wireless tag in which identification information on the nozzle is written in advance, and the read-write unit communicates the lubrication information to the instrument wireless tag and to the nozzle wireless tag when the lubrication detector detects any of the lubrication of the dental instrument or the operation for lubrication.

7. The lubrication information management device according to claim 1, wherein a plurality of the read-write units are deployed separately from one another, and the read-write unit among the plurality of the read-write units which is located closest to the instrument wireless tag at the time of lubrication communicates the lubrication information to the instrument wireless tag.

8. The lubrication information management device according to claim 1, wherein the lubrication unit includes a container containing a lubricant, a plurality of jet ports connected to the container, and a plurality of types of nozzles connected to the plurality of jet ports, respectively, and each corresponding to any type of the dental instrument and a location for lubrication in the dental instrument, and a plurality of the lubrication detectors are provided to the plurality of jet ports, respectively.

9. The lubrication information management device according to claim 1, wherein when the dental instrument targeted for lubrication is determined to have two locations for lubrication on a tip end side and a base end side as a consequence of reading the instrument wireless tag, the read-write unit writes a lubrication history, which includes at least one of the number of times of a lubrication operation on the dental instrument and date and hour of each time of the lubrication operation, in the instrument wireless tag when the dental instrument is lubricated twice.

10. The lubrication information management device according to claim 1, wherein the lubrication unit includes a nozzle to be connected to a location for lubrication on a tip end side of the dental instrument and a nozzle to be connected to a location for lubrication on a base end side of the dental instrument in a state of setting the dental instrument targeted for lubrication and having the two locations for lubrication on the tip end side and the base end side, and when the dental instrument targeted for lubrication is determined to have the two locations for lubrication on the tip end side and the base end side as a consequence of reading the instrument wireless tag, the read-write unit writes a lubrication history, which includes at least one of the number of times of a lubrication operation on the dental instrument and date and hour of each time of the lubrication operation, in the instrument wireless tag when the two locations for lubrication in the dental instrument are lubricated.

* * * * *